(12) United States Patent
Hansen et al.

(10) Patent No.: US 6,349,236 B1
(45) Date of Patent: Feb. 19, 2002

(54) ADAPTIVE SHED STRATEGY FOR CONSTRAINT ENFORCEMENT IN A MULTIVARIATE CONTROL SYSTEM

(75) Inventors: Peter D. Hansen, Wellesley; Nicholas P. Di Vittorio, North Attleboro, both of MA (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/166,880

(22) Filed: Oct. 6, 1998

(51) Int. Cl.[7] ......................... G05B 13/02; G05B 11/32
(52) U.S. Cl. ......................................... 700/67; 700/28
(58) Field of Search ......................... 700/28, 32, 36, 700/47, 67, 295, 296; 705/8; 709/102–108

(56) References Cited

U.S. PATENT DOCUMENTS

| | | | |
|---|---|---|---|
| 4,167,679 A | * 9/1979 | Leyde et al. | 307/35 |
| 4,337,401 A | * 6/1982 | Olson | 307/39 |
| 4,341,345 A | 7/1982 | Hammer et al. | 307/39 |
| 4,345,162 A | 8/1982 | Hammer et al. | 700/296 |
| 4,510,398 A | 4/1985 | Culp et al. | 700/296 |
| 4,551,812 A | * 11/1985 | Gurr et al. | 364/492 |
| 5,006,983 A | * 4/1991 | Wayne et al. | 364/401 |

* cited by examiner

Primary Examiner—William Grant
Assistant Examiner—Elliot Frank
(74) Attorney, Agent, or Firm—Kevin A. Oliver; W. Hugo Liepmann; Foley, Hoag & Eliot LLP (57) ABSTRACT

A method for changing the difference between the number of active controlled variables and the number of available manipulated variables in a multivariate control system. Controlled variables can be adaptively classified into one of an ordered plurality of classes, with each class having a rank that defines its position within the order. If the number of active valid controlled variables exceeds the number of available manipulated variables, the active controlled variables from the lowest ranking class having active controlled variables are then deactivated according to a predefined priority order by setting their associated setpoints equal to their measured values. Otherwise, inactive controlled variables from the highest ranking class having inactive controlled variables are reactivated according to the same predefined priority order by setting their associated setpoints to the desired setpoint values.

39 Claims, 5 Drawing Sheets

| i | $y_i$ | $r_i$ | SP_ramp_target$_i$ |
|---|---|---|---|
| 1 | $y_1$ | $r_1$ | |
| 2 | $y_2$ | $r_2$ | |
| 3 | ⋮ | ⋮ | |
| ⋮ | ⋮ | ⋮ | |
| n | $y_n$ | $r_n$ | |

| i (62) | $y_i$ (64) | $r_i$ (66) | SP_ramp_target$_i$ (68) |
|---|---|---|---|
| 1 | $y_1$ | $r_1$ | |
| 2 | $y_2$ | $y_2$ | $r_2$ |
| 3 | ⋮ | ⋮ | |
| ⋮ | ⋮ | ⋮ | |
| n | $y_n$ | $r_n$ | |

Fig. 5B

ADAPTIVE SHED STRATEGY FOR CONSTRAINT ENFORCEMENT IN A MULTIVARIATE CONTROL SYSTEM

This invention relates to the field of process control systems and, in particular, to a method for adaptively relinquishing and reasserting control over selected controlled variables in a multivariate control system.

BACKGROUND

In a process control system, a controller compares values of a process characteristic, or "controlled variable," with a target value, or "setpoint," to determine whether the process is operating within acceptable bounds. For example, in a biscuit baking process, a controller compares the moisture of the baked product with a desired moisture content value to determine whether batches of biscuits are properly baked.

If the controller determines that the controlled variable is outside normal bounds, it can initiate corrective action by adjusting a parameter, or "manipulated variable," of the process. In the biscuit baking example, if the sample is too moist, the controller can signal an increase in temperature.

In the control system described above, there is but a single controlled variable, moisture, and a single manipulated variable, temperature. Mathematically, the above control system can be represented by the equation $$u=f(r, y)$$

where y represents the controlled variable, moisture, u represents the manipulated variable, temperature, r represents the setpoint, and f represents the system transfer function.

In a multivariate control system, there can be several controlled variables and several setpoints, one corresponding to each controlled variable. Additionally, there can be several manipulated variables. Thus, a multivariate system to be controlled can be characterized by a system transfer function $\bar{f}$ such that $$\bar{u}=\bar{f}(\bar{r}, \bar{y}) \qquad (1)$$

where $\bar{u}$ is a vector of manipulated variables, $\bar{r}$ is a vector of setpoints, and $\bar{y}$ is a vector of controlled variables. To control such a system, it is necessary to choose $\bar{u}$ to minimize the error between the vector of controlled variables, $\bar{y}$, and the vector of setpoints $\bar{r}$. These setpoints represent the desired values for the controlled variables.

In the biscuit baking system described above, if the moisture sensor malfunctions, or if the temperature is already as high as it can go, the control system can no longer function effectively. The situation is different in a multivariate system. If, for example, the device measuring one of the controlled variables malfunctions, there remain other controlled variables which can be controlled. Conversely, if for some reason one of the manipulated variables can no longer be used, there remain other manipulated variables which can be used to control the controlled variables. In either case, it may still be possible to maintain control over some, but not all, of the controlled variables.

Equation (1) provides a mathematical basis for the loss of control over at least one controlled variable upon the loss of a manipulated variable. As a general rule, a unique solution to equation (1) exists only when the dimensionality of the manipulated variable vector $\bar{u}$ equals the dimensionality of the controlled variable vector $\bar{y}$. Where there are more controlled variables than there are manipulated variables, it is generally not possible to control each controlled variable.

In order to maintain control of the multivariate control system, it can be necessary to relinquish control of at least some of the controlled variables. This process of rendering a controlled variable inactive generally includes a step of assigning a priority order to each controlled variable. In this way, control over those controlled variables which have lower priority can be relinquished before control over those controlled variables which have higher priority.

It is known in the art to assign a priority value to each controlled variable and to relinquish control over the controlled variable having the lowest priority value. For example, in a refrigerated boxcar in which one can control both temperature and humidity, one may be willing to forego control of humidity if the alternative is to lose control of the temperature. In such a control system, the humidity has a lower priority value than the temperature and hence control over humidity is relinquished before control over the temperature.

A typical method for selecting those controlled variables over which control is to be relinquished includes the steps of counting the number of active controlled variables and the number of available manipulated variables. By comparing these two numbers, a prior art controller can determine how many controlled variables must be rendered inactive. Typically, the controlled variables are arranged in a predetermined priority order which stays fixed throughout the interval during which the system is to be controlled. The processor then relinquishes control over controlled variables in the order specified by this predetermined priority order, beginning with the lowest priority controlled variable.

A typical implementation of the above prior art method includes the step of counting the number of active controlled variables in a vector of controlled variables by determining whether the measurement of each controlled variable is a valid measurement. If the measurement is valid, the controller considers that controlled variable to be an active controlled variable. If the measurement is invalid, an attempt to exert control over that controlled variable is pointless. Accordingly, the controller relinquishes control over that controlled variable by setting its value equal to its last valid measured value and recalculating the gain matrix of the controller so that the gains associated with that value are zero. This method of relinquishing control over a controlled variable thus suffers from the disadvantage that the gain matrix of the controller is recalculated when the measured value of a controlled variable becomes invalid.

The prior art method also includes the step of counting the number of manipulated variables available for controlling the controlled variables. This includes the steps of determining whether each manipulated variable is output limited. An example of an output limited manipulated variable is one associated with a valve that is already fully open or fully shut. If a particular manipulated variable is not output limited, the controller increments a counter by one. Then, the controller proceeds to the next manipulated variable, if any.

Having determined the number of active controlled variables and the number of available manipulated variables, the prior art method then determines whether the difference between the number of active controlled variables and the number of available manipulated variables requires adjustment. If the number of active controlled variables exceeds the number of available manipulated variables, the controller relinquishes control over the lowest priority active controlled variable by recalculating the gain matrix of the controller so as to render the gains associated with that controlled variable equal to zero. This process is repeated until the number of active controlled variables and the number of available manipulated variables is such that equation (1) has a solution.

It is apparent that the prior art step of counting active controlled variables does not provide for recovery of a controlled variable once control over it has been relinquished. Consequently, a spurious measurement of a controlled variable may result in permanent loss of control over that controlled variable, even though the measurement of that controlled variable is generally reliable.

It is also apparent that the foregoing method relinquishes control over controlled variables according to a predefined priority with no consideration given to the measured values of the remaining controlled variables. The foregoing method is, as a result, not adaptive. A disadvantage of such a non-adaptive method is that it is possible to relinquish control over a low priority controlled variable even though the value of that controlled variable is about to reach dangerous levels. That such a potentially catastrophic result can arise simply because one controlled variable's predefined priority is lower than another's is indicative of the inflexibility of the foregoing method.

It is further apparent that in the foregoing method, the gain matrix for the controller is recalculated each time control over a controlled variable is relinquished and that such recalculation can be burdensome.

A further disadvantage of the foregoing method is that the gains applied to that controlled variable are set to zero regardless of how high or low its current measured value becomes. The inactive controlled variable is thus completely unconstrained and its value can therefore reach dangerous levels.

It is desirable in the art, therefore, to provide a method and apparatus for relinquishing control over controlled variables without the burden of repeatedly recalculating the controller gain matrix, for adaptively altering the order in which control over controlled variables is relinquished, for monitoring the measured values corresponding to these controlled variables, and for restoring control over those controlled variables whose measured values satisfy predetermined properties.

SUMMARY OF THE INVENTION

These disadvantages are alleviated in the method of the invention in which the difference between the number of active controlled variables and the number of available manipulated variables is adjusted during each control cycle according to an adaptively controlled priority order instead of according to a fixed priority order. This change can be effected either by relinquishing control over an active controlled variable or by reasserting control over an inactive controlled variable. Control over a controlled variable is relinquished or reasserted by controlling the difference between the value of the controlled variable and the value of its associated setpoint.

In the method of the invention, each active controlled variable has a valid measured value, a predefined priority value, and an associated setpoint which is initially set to an original setpoint value. Adaptive control over the priority order is obtained by classifying the controlled variables, preferably based on their measured values, into one of a plurality of classes, each class having a rank specifying the priority of that class relative to all other classes. Since this classification step is dependent on measured values of the controlled variable, it is inherently an adaptive process.

In the preferred embodiment, a controlled variable is classified as belonging to a particular class by examining the difference between the measured value of the controlled variable and the endpoints of a desired interval. If the value of the controlled variable is outside the desired interval, the method recognizes that this controlled variable is in need of control and assigns it to a class having a high rank. Conversely, if the controlled variable is near its original setpoint value, the method recognizes that this controlled variable is not in need of control and therefore assigns it to a lower ranking class.

The first active controlled variable over which control is relinquished is that active controlled variable which is both in the class having the lowest rank and which has the lowest priority value of all active controlled variables within that class. Control over additional active controlled variables belonging to the lowest ranking class is relinquished according to the predefined priority values of those controlled variables. If, after having relinquished control over all the active controlled variables from the lowest ranking class, additional controlled variables are to be deactivated, these controlled variables are selected from the next lowest ranking class. Control over these active controlled variables is likewise relinquished in an order determined by their preassigned priority values.

Conversely, when the number of active controlled variables is smaller than the number of available manipulated variables, inactive controlled variables are reactivated to make up the difference. The first inactive controlled variable to be reactivated is that which has the highest priority of all the inactive controlled variables in the highest ranking class. Control over additional inactive controlled variables from the highest ranking class is reasserted according to the predefined priority values of these inactive controlled variables. If, after having reasserted control over all inactive controlled variables from the highest ranking class it is necessary to reassert control over additional inactive controlled variables, these can be selected from the next highest ranking class according to their predefined priority order.

During periods of normal operation, the value of a controlled variable is equal to its measured value and the value of its associated setpoint is equal to its original setpoint value. The difference between the value of the controlled variable and the value of its associated setpoint is thus representative of the degree of correction required for that controlled variable. In the method of the invention, control over a selected controlled variable is relinquished by forcing this difference to equal zero. Conversely, control over a controlled variable is reasserted by restoring this difference to its correct value.

According to the method of the invention, there are at least two methods for forcing the difference between a selected controlled variable and its associated setpoint to equal zero. In the first method, which we refer to as "shedding the setpoint," the value of the associated setpoint, which is normally set equal to its original setpoint value, is replaced by the measured value of the controlled variable. In the second method, which we refer to as "shedding the controlled variable," the value of the controlled variable, which is normally equal to its measured value, is replaced by the value of its associated setpoint, which is equal to its original setpoint value. In both cases, the effect is the same: the difference between the value of the controlled variable and the value of its associated setpoint is forced to equal zero.

The choice of whether to relinquish control over a controlled variable by shedding its setpoint or by shedding the controlled variable depends on the reason for relinquishing control. If control is being relinquished because the measured value of the controlled variable is invalid, then the controlled variable is shed by setting the value of the controlled variable equal to its setpoint. Otherwise, the controlled variable's associated setpoint is shed by setting the value of the associated setpoint equal to the measured value of the controlled variable.

The controller typically relies on the difference between the measured value of the controlled variable and the value of its associated setpoint as an indication of how much control is necessary over that controlled variable. Consequently, setting this difference to zero, either by shedding the controlled variable or shedding its associated setpoint, causes the controller to give up control over that controlled variable. As a result, the method of the invention makes it unnecessary to recompute the gain matrix of the controller in order to relinquish control over a controlled variable. In this way, the method of the invention permits control over controlled variables to be readily relinquished without the need to recalculate the gain matrix.

Control over a controlled variable is reasserted by allowing the difference between the value of the controlled variable and the value of its associated setpoint to correspond to the difference between the measured value of the controlled variable and the original setpoint value. Again, there are two methods for doing so. In the first method, referred to as "unshedding the setpoint," the value of the associated setpoint is restored to the original setpoint value. In the second method, referred to as "unshedding the controlled variable," the value of the controlled variable is restored to its measured value. In both cases, the result is the same: the difference between the controlled variable and its associated setpoint becomes the difference between the measured value of the controlled variable and the original setpoint value.

The choice of whether to unshed the controlled variable or to unshed its associated setpoint depends on which method was used to relinquish control over the controlled variable. If control over the controlled variable was relinquished by shedding its associated setpoint, then control over that controlled variable is reasserted by unshedding its associated setpoint. Conversely, if control over the controlled variable was relinquished by shedding the controlled variable, then control over that controlled variable is reasserted by unshedding the controlled variable.

Since, as described above, the controller typically relies on the difference between the setpoint and the measured value, and since, after unshedding either the controlled variable or its associated setpoint this difference is no longer forced to equal zero, the controller reasserts control over the controlled variable. In either case, the gain matrix of the controller need not be recalculated in order to reassert control over a controlled variable.

In certain classes of systems to be controlled, unshedding a setpoint abruptly can introduce, transients into the system under control. Thus, in one embodiment of the invention, the likelihood of introducing undesirable transients while unshedding a setpoint is reduced by gradually changing the value of the associated setpoint from the measured value of the controlled variable to the original setpoint value. This is accomplished by allowing the value of the associated setpoint to follow a ramp function having an initial value set to the measured value of the controlled variable and a final value set to the original setpoint value. As can be appreciated by one of skill in the art, the original setpoint value can be stored in a temporary location when the setpoint is shed and retrieved from that temporary location in order to construct the ramp function. The initial and final values of the ramp function can be separated by a selected unshedding time interval. Alternatively, the ramp rate, or slope, of the ramp function can be specified, in which case the unshedding time interval is selected on the basis of the specified ramp rate and the difference between the measured value of the controlled variable and the original setpoint value.

In another embodiment of the invention, the likelihood of introducing undesirable transients while unshedding a controlled variable is reduced by gradually changing the value of the controlled variable from its original setpoint value to its measured value. This is accomplished by allowing the value of the controlled variable to follow a ramp function having an initial value set to the original setpoint value for that controlled variable and a final value set to the measured value of that controlled variable. The initial and final values of this ramp function can be separated by a selected unshedding time interval.

The ramp functions for unshedding either the controlled variable or the setpoint can be linear, exponential, or any other shape having initial and final locations at the correct values and separated by the selected unshedding interval.

DESCRIPTION OF THE DRAWINGS

The foregoing and other objects, features and advantages of the invention will be apparent from the following description and the accompanying drawings

DETAILED DESCRIPTION

Figure 1:
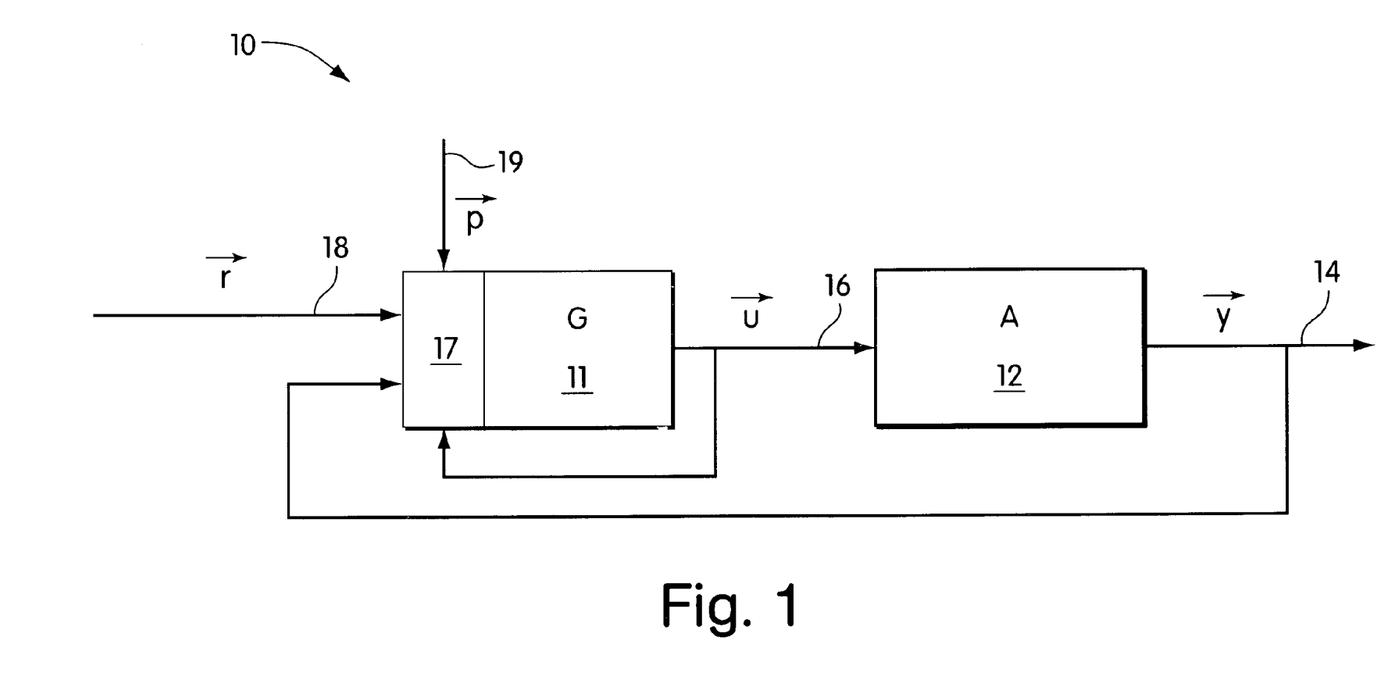
FIG. 1 shows a multivariate controller connected to a system to be controlled.

Referring to FIG. 1, a control system 10 for implementing the method of the invention includes a multivariate controller 11 characterized by a gain matrix G. The multivariate controller 11 is in communication with a system to be controlled 12 characterized by a transfer function A. The system to be controlled 12 generates a vector of controlled variables $\bar{y}$ 14 in response to a vector of manipulated variables $\bar{u}$ 16 generated by the multivariate controller 11. These controlled variables are ordered according to a vector of predefined priorities $\bar{p}$ 19 where the $i^{th}$ element of $\bar{p}$ is the priority associated with $i^{th}$ element of $\bar{y}$. The measured values of these controlled variables 14 are then fed back to a processor 17 associated with the multivariate controller 11.

The multivariate controller 11 assigns values to the elements of the vector of manipulated variables $\bar{u}$ so as to minimize an error between the vector of measured controlled variables $\bar{y}$ and a vector of setpoints $\bar{r}$ 18. The original setpoint values assigned to the elements of the setpoint vector $\bar{r}$ 18 correspond to the desired values for the corresponding elements in the vector of controlled variables $\bar{y}$. During operation of the system, the controller 11 may lose control over one or more of the manipulated variables $u_j$. Such a loss of control can occur when a manipulated variable is output limited, for example when it is associated with a valve that is already fully open or fully shut. Loss of control can also occur when a manipulated variable is purposely placed under manual control. In either case, when the controller loses control over one or more manipulated variables, control over the necessary number of elements in the vector of controlled variables $\bar{y}$ may be relinquished to ensure that equation (1) has a solution.

Note that loss of control over a manipulated variable need not result in the processor 17 relinquishing control over any controlled variables. For example, if the number of controlled variables is less than the number of manipulated variables, it is possible to lose control of a manipulated variable and still maintain control over all the controlled variables.

Those control variables over which control is relinquished are referred to as "inactive" controlled variables. The remaining controlled variables, over which the controller 11 maintains control, are "active" controlled variables. Similarly, those manipulated variables over which control is lost are referred to as "unavailable" manipulated variables. The remaining manipulated variables are "available" manipulated variables. For the control system 10 to function correctly, the number of active controlled variables must not exceed the number of available manipulated variables.

As shown in FIG. 1, the controller 11 is also in communication with a processor 17 which determines which active controlled variables are to be rendered inactive, which inactive controlled variables are to be rendered active, and which controlled variables are to remain in the same state. The processor 17 performs this task by classifying each controlled variable, based on its measured value, as belonging to one of several classes, each class having an associated rank. While in the preferred embodiment only two classes are described, namely a class-I having a lower rank and a class-II having a higher rank, it will be appreciated that there can be any number of classes having differing membership criteria.

Figure 2:
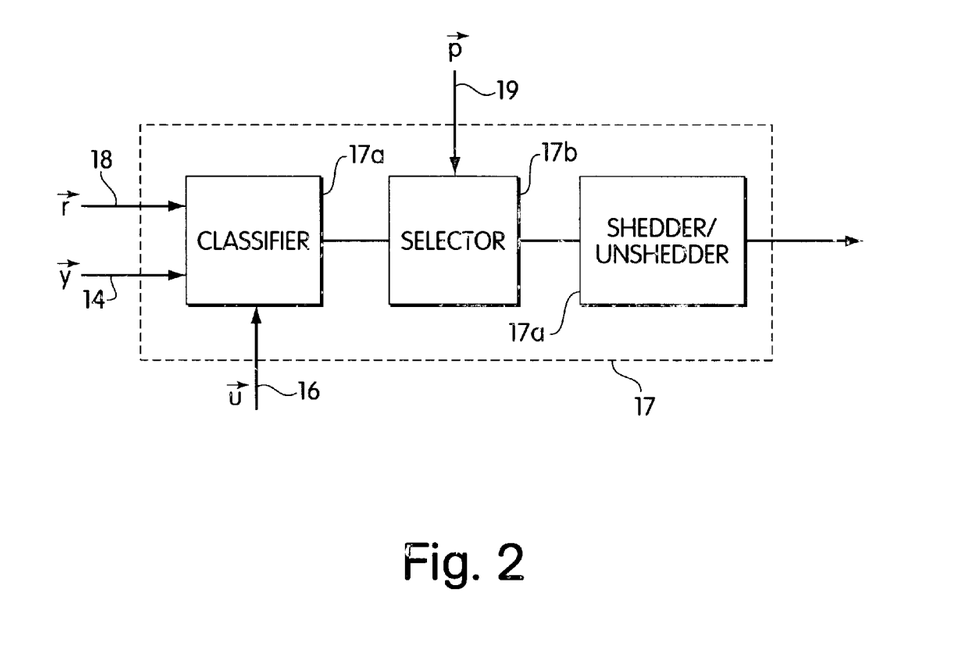
FIG. 2 shows the processor section from the controller of FIG. 1.

As shown in FIG. 2, the processor 17 includes a classifier section 17a which places a controlled variable in one of several classes based on a suitable metric. In the case of the preferred embodiment, that metric is the extent to which the measured value of the controlled variable $y_i$ deviates from a desired interval.

The processor 17 further includes a selector section 17b for determining which active controlled variable to deactivate or which inactive controlled variable to activate. This is followed by a shedder/unshedder section 17c which implements either a shedding algorithm to deactivate an active controlled variable or an unshedding algorithm to reactivate an inactive controlled variable.

The processor 17, which can be implemented either by specifically designed electronic circuitry or by software instructions on a general purpose data processor, classifies a controlled variable as a class I controlled variable when its measured value falls within a desired interval. The processor first relinquishes control over those controlled variables whose measured values fall within the desired interval. These controlled variables are generally not in urgent need of control because they are already relatively close to their associated setpoints. As a result, it is advantageous to relinquish control over these controlled variables first.

In the preferred embodiment, the processor classifies a controlled variable as a class-II controlled variable when its measured value falls outside the desired interval. The processor relinquishes control over these controlled variables last because it is controlled variables having measured values which are outside their desired intervals that are in most urgent need of control.

Figure 3:
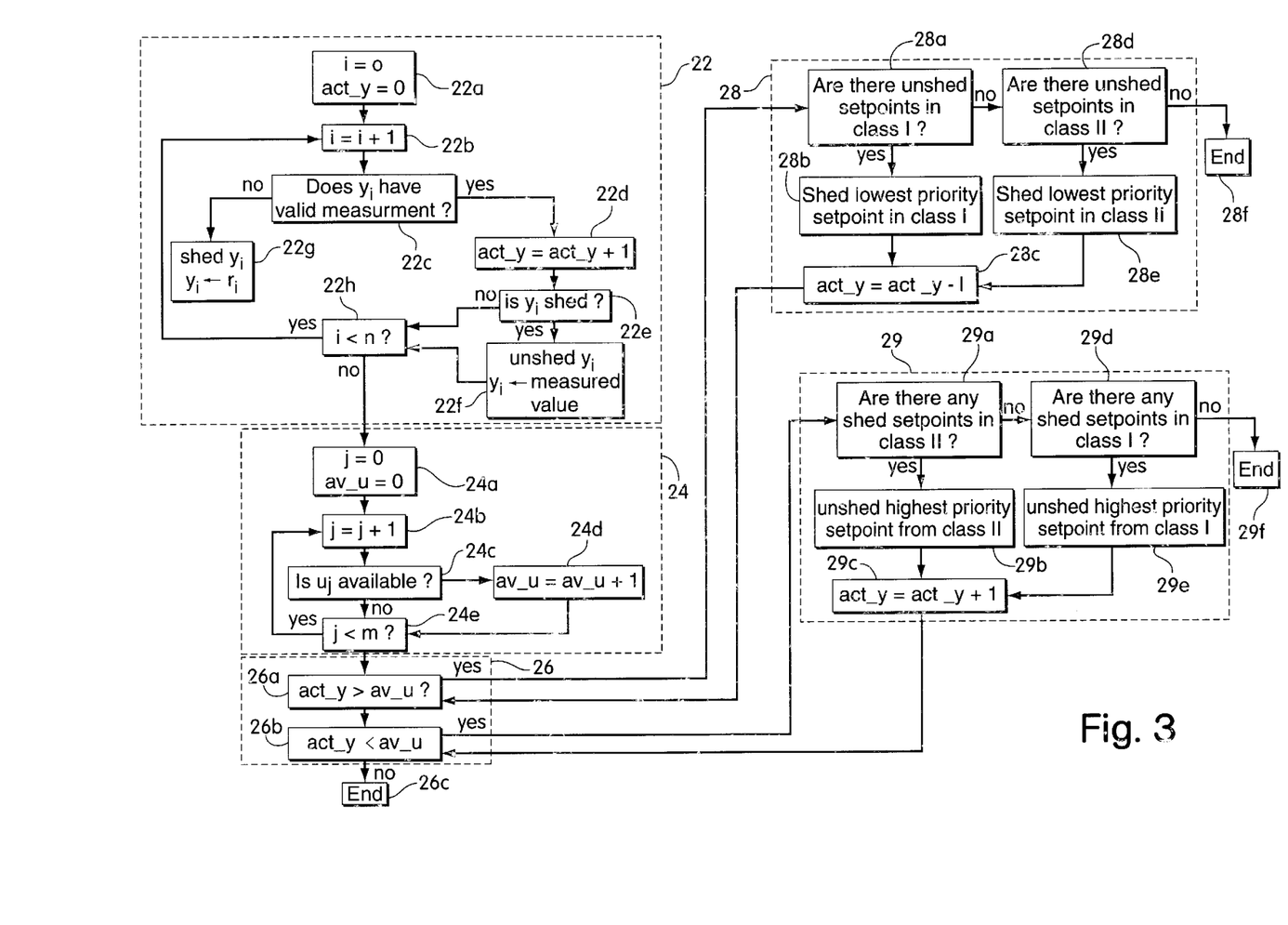
FIG. 3 shows one control cycle of the shedding algorithm of the invention as implemented by the controller of FIG. 1.

Referring to FIG. 3, each control cycle includes the step 22 of counting the number of active controlled variables $y_i$ and the step 24 of counting the number of available manipulated variables $u_j$. Once the number of available manipulated variables $u_j$ and the number of active controlled variables $y_i$ have both been determined, the step 26 of determining whether or not to relinquish or reassert control over any controlled variables can be performed. In general, when the number of available manipulated variables $u_j$ equals or exceeds the number of active controlled variables $y_i$, equation (1) has a solution. It is therefore preferable to relinquish or reassert control over as many controlled variables as necessary to make the number of active controlled variables as close to the number of available manipulated variables as possible.

If the number of available manipulated variables is such that it is unnecessary to change the number of active controlled variables, the method terminates 26c until the next control cycle.

If, on the other hand, control over one or more active controlled variables must be relinquished, the step 28 of deciding which active controlled variable to relinquish control over must be executed. This step 28 includes the step 28a of determining whether there are any active controlled variables which are both in the lowest ranking class, namely class-I, and over which control has not been relinquished. If the answer is yes, the processor executes the step 28b of relinquishing control over that active controlled variable in the lowest ranking class which has the lowest priority. Having done so, the processor then determines 26 whether the number of available controlled variables is equal to the number of available manipulated variables.

If, on the other hand, all controlled variables in the lowest ranking class are already inactive, the processor proceeds to the next lowest ranking class, namely class II. The processor executes the step 28d of determining whether there are any active controlled variables in class-II over which control can be relinquished. If there are, the processor executes the step 28e of relinquishing control over the lowest priority active controlled variable from the set of controlled variable in class-II. If all controlled variables in class-II are already inactive, and if class-II is the only remaining class, the method terminates 28f until the next control cycle.

Although the method depicted in FIG. 3 shows only two classes of controlled variables, it will be appreciated by one skilled in the art that the method can readily be extended to encompass additional classes of controlled variables. Moreover, although the criterion for classifying controlled variables in the preferred embodiment is whether the measured value of the controlled variable is inside or outside a pre-selected range, one skilled in the art will recognize that other criteria are possible. For example, the rate of change of a controlled variable with respect to time may be indicative of an urgent need for control over that variable. The distance between the measured value of a controlled variable and its associated setpoint may, in some embodiments, indicate a need for control over that controlled variable. Additionally, the preselected interval can be adaptively defined.

In the preferred embodiment, controlled variables are likewise placed in class II by the classifier section 17a of the processor 17. In the case of a two class system as shown in FIG. 3, class II is a residual class which holds all controlled variables not placed in class I. However, it will be apparent that, in a system having more than two classes, other metrics can also be used by the classifier section 17a in determining whether to place a controlled variable into class II.

As shown in FIG. 3, each control cycle includes the steps of counting 22 the number of active controlled variables, counting 24 the number of available manipulated variables, deciding 26 whether control over a controlled variable must be relinquished or reasserted, and relinquishing control 28 or reasserting control 29 over controlled variables in a selected order. In the method shown in FIG. 3, it is assumed, without loss of generality, that there are n controlled variables and m manipulated variables available for controlling the n controlled variables. Additionally, although FIG. 3 depicts the step 22 of counting the active controlled variables as occurring before the step of counting 24 the available manipulated variables, it will be appreciated by those skilled in the art that the order of these steps can be interchanged and that these steps can be performed concurrently.

Referring to FIG. 3, the step of counting 22 the number of active controlled variables begins when the processor 17 initializes 22a an index i and a counter act_y which represents the number of active controlled variables. The processor 17 then increments 22b the index i and verifies 22c that the measured value of the $i^{th}$ controlled variable $y_i$ is valid. If the measured value is valid, the processor 17 increments 22d the active controlled variable counter act_y and determines 22e if the controlled variable has been shed. If it has, the processor 17 unsheds 22e the controlled variable by setting its value equal to its measured value. If, on the other hand, the measured value proves to be invalid, the processor 17 bypasses the step 22d of incrementing act_y and "sheds" 22g the controlled variable $y^i$ by setting its value equal to the value of its corresponding setpoint $r_i$. Regardless of the validity of the measurement, the processor 17 determines 22h whether there are additional measured values to be checked. If there are, the processor repeats the loop. Otherwise, the processor 17 proceeds to the step 24 of counting available manipulated variables.

By shedding 22g the controlled variable when its measured value is invalid, the processor 17 ensures a zero control error for that controlled variable. This deceives the controller 11 into considering that controlled variable to be correctly set and to therefore require no control. As a result, the controller 11 does not attempt to control a controlled variable whose invalid measured value suggests that it cannot reliably be measured. Note that it is not necessary to recalculate the gain matrix G of the controller 11 after shedding 22g a controlled variable in this manner. This is because any gain term multiplying a zero control error has no effect on the manipulated variables. Thus, unlike the prior art method in which invalid measurement are disregarded by recalculating the gain matrix so as to render the gains associated with an error equal to zero, the present method of shedding 22g the controlled variable sets the error itself equal to zero by eliminating any difference between the setpoint value and the value of the controlled variable.

It is possible for a controlled variable $y_i$ to have an invalid measured value in one control cycle and to have a valid measured value in a subsequent control cycle. In such a case, the value of the controlled variable has typically already been set to its corresponding setpoint as a result of having had an invalid value in a previous cycle. For this reason, during each control cycle, the processor 17 checks 22c the validity of each controlled variable, regardless of whether that controlled variable had a valid or invalid measurement in an earlier control cycle. If necessary, the processor unsheds 22f the controlled variable.

Figure 4A:
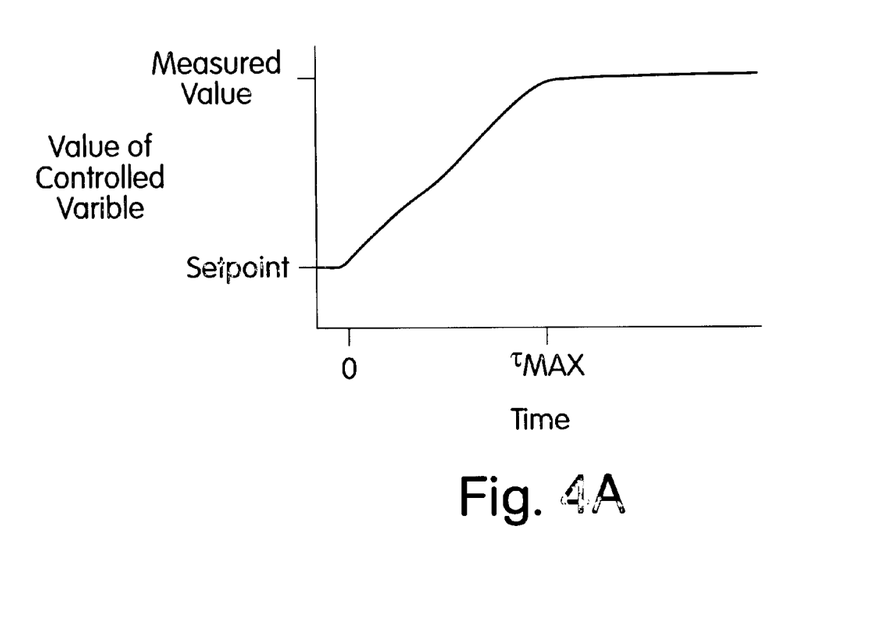
FIG. 4A shows a typical ramp function used in the method of FIG. 3 to reassert control over a controlled variable by setting the value of the controlled variable equal to its measured value.

Unshedding 22f a previously shed controlled variable is accomplished by setting its value, which, as a result of its having been shed is equal to its original setpoint value $r_i$, to its now valid measured value. To avoid the introduction of transients into the system 12 under control, it is preferable to unshed a controlled variable $y_i$ gradually rather than instantaneously. In the preferred embodiment, this is accomplished by defining a transition function, shown in FIG. 4A, having abscissas extending between the original setpoint value for that controlled variable and the now valid measured value of that controlled variable. The process of unshedding a controlled variable can thus be spread out over an unshedding interval by setting the value of the controlled variable to values between its measured value and its original setpoint value during the unshedding interval. Although the function illustrated in FIG. 4A is a ramp, it is apparent that other functions, such as exponential functions, can also be used without introducing transients into the system.

The step of counting 24 the number of available manipulated variables $u_j$ begins with the processor 17 initializing 24a an index j and a counter av_u which represents the number of available manipulated variables by setting them both equal to zero. The index j is incremented 24b by one and the processor checks 24c the manipulated variable to verify that it is available for manipulation by the controller 11. The controller 11 may lose the ability to manipulate a manipulated variable for a number of reasons. For example, the manipulated variable may be output limited as a result of a valve which is already completely shut or completely open. Alternatively, the manipulated variable may have been purposely placed under manual control. If the processor 17 determines that the controller 11 has the ability to manipulate the manipulated variable $u_j$, it increments 24d the counter av_u. If not, the processor 17 checks 24e whether or not it has reached the last manipulated variable $u_j$. If it has not, the processor 17 increments 24b the index j and repeats the loop. If it has, the step of counting 24 the active manipulated variables is complete and the processor 17 proceeds to the step of determining 26 how many controlled variables, if any, to relinquish control over or to reassert control over.

In deciding how many controlled variables $y_i$ to relinquish control over, the processor 17 determines 26a whether the number of available manipulated variables, av_u is less than the number of active controlled variables, act_y. If the number of active controlled variables act_y exceeds the number of available manipulated variables av_u, then the processor 17 commences the step of relinquishing control 28 over the necessary number of controlled variables $y_i$ according to an adaptively determined order. If, on the other hand, the number of active controlled variables act_y is less than the number of available manipulated variables, av_u then the processor commences the step of reasserting control 29 over the necessary number of controlled variables according to an adaptively determined order. Finally, if the number of available manipulated variables is equal to the number of active controlled variables, the processor 17 considers both the step of relinquishing control over a controlled variable and the step of reasserting control over a controlled variable to be unnecessary. In such a case, the processor 17 terminates 26c the control cycle.

As shown in FIG. 3, the processor preferentially relinquishes control over those controlled variables belonging to class-I by shedding their associated setpoints. These controlled variables are placed in class I by the classifier section 17a of the processor 17 based on their measured values and their corresponding setpoint limits. For example, in the preferred embodiment, for each controlled variable in class I, $r_{i,min} < y_i < r_{i,max}$ where $r_{i,max}$ and $r_{i,min}$ are setpoint limits.

If the number of active controlled variables needs to be reduced, the processor 17 determines 28a if there are any unshed setpoints in the lowest priority class, class-I. If there are, then the processor 17 relinquishes control over that controlled variable within class-I which is both active and which has the lowest predefined priority value $p_i$. As discussed above, shedding the setpoint means setting the difference between the value of the controlled variable and the value of its associated setpoint equal to zero by setting the value of the setpoint equal to the measured value of the controlled variable. By setting this difference equal to zero in this manner, the processor 17 ensures that the controller 11 sees no error between the value of the controlled variable and its setpoint. The causes the controller 11 to consider that the controlled variable associated with a shed setpoint does not require control.

After shedding 28b the lowest priority setpoint, the processor 17 decrements 28c the active controlled variable counter and checks 26a to see if the number of active controlled variables is still greater than the number of available manipulated variables. If the number of active controlled variables still exceeds the number of available manipulated variables, the processor 17 continues to relinquish control 28b over active controlled variables from class-I, according to increasing priority values, until there are no active controlled variables remaining within that class.

If upon checking 28a to see if there are any unshed setpoints in class-I the processor 17 determines that it has exhausted the supply of active controlled variables in class-I, the processor 17 checks 28d to see if there any unshed setpoints in class-II. If there are, the processor 17 proceeds to shed 28e the lowest priority setpoint in class-II and to decrement 28c the number of active controlled variable counter, act_y. The processor 17 then determines 26a whether the active controlled variables is still in excess of the number of available manipulated variables.

Within the higher ranking class-II, the controlled variables $y_i$ are likewise prioritized according to their predefined priority values $p_i$. The processor 17 then relinquishes control over that controlled variable which is both active and which has the lowest priority value out of all the controlled variables in class-II. If necessary, the processor 17 continues to relinquish control over active controlled variables from class-II, according to increasing priority values, either until the number of active controlled variables equals the number of active manipulated variables or until there are no further active controlled variables within class-II.

The foregoing process of shedding setpoints proceeds until either the processor 17 determines 26a that the number of active controlled variables is no longer greater than the number of available manipulated variables or until there are no longer any unshed setpoints, and therefore no longer any active controlled variables to relinquish control over. If the processor 17 determines 26a that the number of controlled variables is no longer greater than the number of available manipulated variables, the processor 17 proceeds to the step of determining 26b whether the number of active controlled variables is less than the number of available manipulated variables. Since the answer to this will be "no," the processor 17 terminates 26c the control cycle. If, on the other hand, the processor 17 determines 28d that there are no longer any unshed setpoints, the processor 17 terminates 28f the control cycle.

If the processor 17 determines 26a that the number of active controlled variables is not in excess of the number of available manipulated variables, then the step 28 of shedding setpoints according to an adaptively determined priority order is bypassed and the processor 17 proceeds to the step of determining 26b whether the number of active controlled variables is less than the number of available manipulated variables. If it is not, then it follows that the number of active controlled variables is equal to the number of available manipulated variables and the processor 17 terminates 26c the control cycle. If, on the other hand, the number of active controlled variables is less than the number of available manipulated variables, then the processor 17 proceeds to the step of unshedding 29 setpoints according to an adaptively defined priority order.

The process of adaptively unshedding 29 setpoints proceeds in a manner analogous to the process of adaptively shedding 28 setpoints. The processor 17 begins by determining 29a whether there are any shed setpoints in the highest ranking class, namely class-II. If there are, then the processor unsheds 29b the highest priority setpoint from class-II by replacing the value of that setpoint, which as a result of its having been shed is equal to the measured value of its associated controlled variable, with the original setpoint value. The processor 17 then increments 29c the active controlled variable counter, act_y, and checks 26b whether the number of active controlled variables is still less than the number of available manipulated variables. If it is, then the processor 17 repeats the step of adaptively unshedding 29 setpoints in order to reassert control of additional controlled variables.

If the processor 17 determines 29a that there are no shed setpoints in class-II, then the processor 17 proceeds to determine 29d if there are any shed points in class-I. If there are, the processor 17 unsheds 29e the highest priority setpoint in the same manner as described above in connection with the step of unshedding 29b the highest priority setpoint from class-II. The processor 17 then increments the active controlled variable counter, act_y, and determines 26b whether the number of active controlled variables is still smaller than the number of available manipulated variables.

The step of adaptively unshedding 29 setpoints in this manner proceeds until there are no longer any shed setpoints in any classes, in which case the processor 17 terminates 29f the control cycle, or until the number of active controlled variables is equal to the number of available manipulated variables, in which case the processor 17 likewise terminates 26c the control cycle.

Figure 5A:
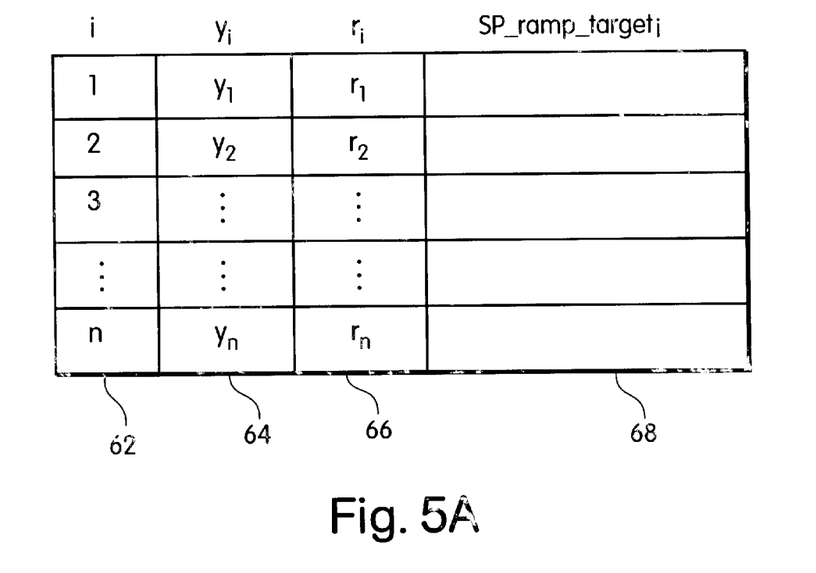
FIGS. 5A and 5B show the contents of the processor's registers during the shedding of a controlled variable as depicted in the method of FIG. 3.
Figure 5B:
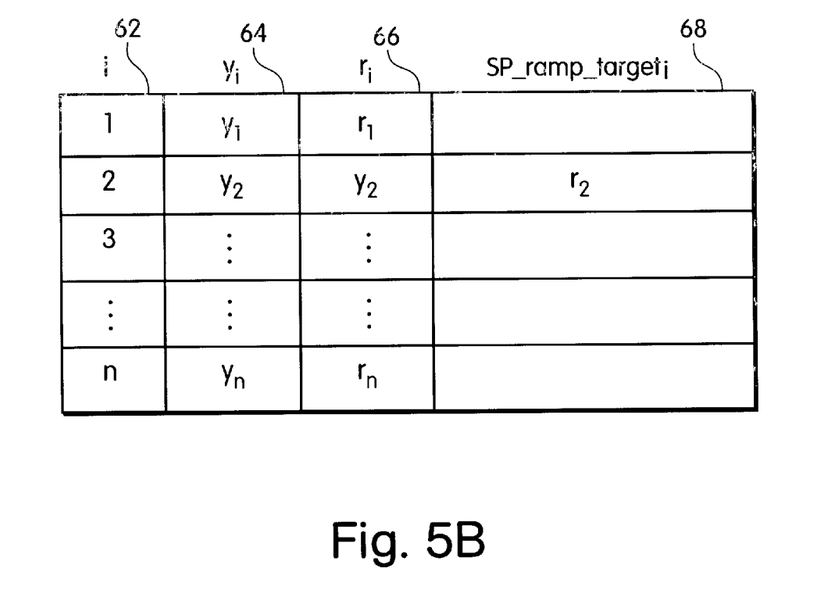

The steps of relinquishing control 28b, 28e, over an active controlled variable include the steps of storing the original setpoint value $r_i$ associated with the controlled variable in a buffer, SP_ramp_target(i), for use if and when control over that controlled variable is later reacquired. This procedure is best understood by examination of FIG. 5A which shows the state of the processor's registers when all controlled variables are active. Note that the original setpoint value array 66 contains the setpoints corresponding to each controlled variable $y_i$ in the controlled variable array 64. FIG. 5B shows the state of the registers after control over a particular controlled variable, in this case $y_2$ has been relinquished.

Note that the setpoint array 66 no longer contains the original setpoint value $r_2$. Instead, it contains the measured value of the controlled variable. The original setpoint value $r_2$ corresponding to $y_2$ is now element 2 in the setpoint ramp array 68. By setting the setpoint for $y_2$ equal to the measured value of $y_2$, a process referred to as "shedding the setpoint," the controller 11 is, in effect, deceived into giving up control over $y_2$. By storing the original setpoint value $r_i$ in the setpoint ramp array 68, the controller 11 can later unshed the setpoint by restoring this original setpoint value $r_i$ into the setpoint array 66. This has the effect of causing the controller 11 to reacquire control over that controlled variable.

Preferably, to avoid introducing transients into the process, the setpoint is unshed gradually as described above in connection with unshedding a controlled variable. This is accomplished by defining a transition function as shown in FIG. 4B, in which the initial value of the ramp function is the measured value of the controlled variable and the final value of the ramp function is the original setpoint value.

Applicants have discovered that the discontinuity introduced by simply overwriting the setpoint array can introduce undesirable transients into the system. Accordingly, in the preferred embodiment, the processor 17 incrementally changes the value of the associated setpoint over a time interval according to a transition function such as the ramp function shown in FIG. 4B.

Figure 4B:
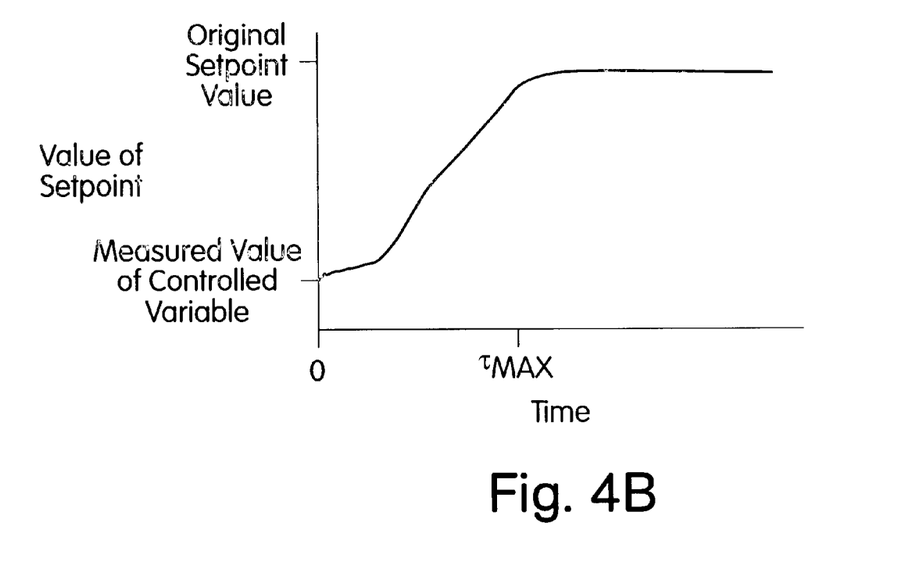
FIG. 4B shows a typical ramp function used in the method of FIG. 3 to reassert control over a controlled variable by setting the value of its associated setpoint to its original setpoint value.

The processor 17 unsheds 29b a setpoint by generating a ramp function, as shown in FIG. 4B. To do so, the processor 17 retrieves the original setpoint value from the buffer, SP_ramp_target(i) 68, and uses that value as the ending value of the ramp function shown in FIG. 4B. The processor then sets the setpoint corresponding to the controlled variable equal to successive values of the ramp function throughout the unshedding interval between 0 and $t_{max}$. In this way, the setpoint, and hence the controlled variable, is brought gradually to the original setpoint value, thereby avoiding the generation of undesirable transients in the system under control.

It will thus be seen that the invention efficiently attains the objects set forth above. Since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all generic and specific features of the invention described herein, and all statements of the scope of the invention which as a matter of language might be said to fall there between. Having described the invention, what is claimed as new and secured by Letters Patent is:

What is claimed is:

1. In a multivariate control system having
   an ordered plurality of controlled variables, each of said controlled variables having
      a measured value
      a predefined value defining its position within the order, and
      an associated setpoint having an original setpoint value, each of said controlled variables being selected from
         active controlled variables and
         inactive controlled variables, and
   a plurality of manipulated variables, each of said manipulated variables being selected from available manipulated variables and unavailable manipulated variables,
   a method for changing the difference between the number of active controlled variables and the number of available manipulated variables, said method comprising:
      classifying each of said controlled variables as belonging to one of an ordered plurality of classes, each of said classes having a rank defining its position within the order, and,
      changing the number of said active controlled variables, said changing further including at least one of,
         relinquishing control over a lowest priority controlled variable, said lowest priority controlled variable being that active controlled variable which is in the class having the lowest rank and which has the lowest priority of all controlled variables in that class, and
         asserting control over a highest priority controlled variable, said highest priority controlled variable being that inactive controlled variable which is in the class having the highest rank and which has the highest priority of all controlled variables in that class.

2. The method of claim 1 wherein said step of relinquishing control comprises the step of setting the setpoint of said lowest priority controlled variable equal to the measured value of said lowest priority controlled variable.

3. The method of claim 1 wherein the step of asserting control over a highest priority controlled variable comprises the step of setting the setpoint associated with said highest priority controlled variable equal to said original setpoint value.

4. The method of claim 1 wherein said step of relinquishing control over a lowest priority controlled variable comprises the step of setting the difference between the value of said lowest priority controlled variable and the value of the setpoint associated with said lowest priority controlled variable equal to zero.

5. The method of claim 1 wherein said classifying step comprises the step of determining whether the measured value of said active controlled variable is outside a selected range.

6. The method of claim 1 further comprising the step of determining a desired number of active controlled variables.

7. The method of claim 6 wherein the determining step comprises the steps of
   determining whether the measured value of a selected controlled variable is valid or invalid,
   setting the value of the selected controlled variable to be equal to its original setpoint value if the measured value is invalid and the controlled variable is an active controlled variable, and
   setting the value of the selected controlled variable to the measured value is valid and the controlled variable is an inactive controlled variable.

8. The method of claim 7 wherein the step of setting the value of the selected controlled variable equal to the measured value comprises the steps of
   defining an unshedding interval having
      a first endpoint at which the value of the selected controlled variable is equal to its original setpoint value, and
      a second endpoint at which the value of the selected controlled variable is equal to the measured value,
   continuously varying the value of the selected controlled variable measurement variable during the unshedding interval.

9. The method of claim 8 wherein the step of continuously varying the value of the selected controlled variable measurement value during the unshedding interval comprises the step of linearly varying the value of the controlled variable between its measured value and its original setpoint value.

10. The method of claim 6 wherein the step of determining the desired number of active controlled variables includes the step of determining the number of active manipulated variables.

11. The method of claim 10 wherein the step of determining the number of active manipulated variables comprises the step of determining whether a selected manipulated variable is responsive to control.

12. The method of claim 1 wherein said relinquishing step further comprises the step of storing the original setpoint value.

13. A system for changing the difference between a number of active controlled variables and a number of available manipulated variables in a multivariate control system having
    an ordered plurality of controlled variables, each of said controlled variables having
        a measured value,
        a predefined priority value defining its position within the order, and
        an associated setpoint having an original setpoint value,
    each of said controlled variables being selected from
        active controlled variables, and
        inactive controlled variables, and
    a plurality of manipulated variables, each of said manipulated variables being selected from available manipulated variables and unavailable manipulated variables,
    said system comprising
        classifier means for classifying each of said controlled variables as belonging to one of an ordered plurality of classes, each of said classes having a rank,
        control relinquishing means for relinquishing control over a lowest priority controlled variable, said lowest priority controlled variable being that active controlled variable which is in the class having the lowest rank and which has the lowest priority of all controlled variables in that class, and
        control acquisition means for asserting control over a highest priority controlled variable, said highest priority controlled variable being that inactive controlled variable which is in the class having the highest rank and which has the highest priority of all controlled variables in that class.

14. The system of claim 13 wherein said control relinquishing means comprises shedding means for setting the setpoint of said lowest priority controlled variable equal to the measured value of said lowest priority controlled variable.

15. The system of claim 13 wherein said control acquisition means comprises means for setting the setpoint associated with said highest priority controlled variable equal to said original setpoint value.

16. The system of claim 13 wherein said control relinquishing means comprises means for setting the difference between the value of said lowest priority controlled variable and the value of the setpoint associated with said lowest priority controlled variable equal to zero.

17. The system of claim 13 wherein said classifier means comprises means for determining whether the measured value of the active controlled variable is outside a selected range.

18. The system of claim 13 further comprising means for determining a desired number of active controlled variables.

19. The system of claim 18 wherein said means for determining the desired number of active controlled variables comprises
    validation means for validating the measured value of a selected controlled variable, thereby determining whether its measured value is valid or invalid,
    controlled variable shedding means for setting the value of the selected controlled variable to be equal to its original setpoint value if the measured value is invalid and the controlled variable is an active controlled variable, and
    controlled variable unshedding means for setting the value of the selected controlled variable to be equal to its measured value if the test measurement is valid and the controlled variable is an inactive controlled variable.

20. The system of claim 19 wherein said means for setting the value of the selected controlled variable equal to its measured value comprises
    means for defining an unshedding interval having
        a first endpoint at which the value of the selected controlled variable is equal to its original setpoint value, and
        a second endpoint at which the value of the selected controlled variable is equal to its measured value, and
    means for continuously varying the value of the selected controlled variable during said unshedding interval.

21. The system of claim 20 wherein the means for continuously varying the value of the selected controlled variable during shedding interval comprises means for linearly varying the measured value of the selected controlled variable between its measured value and its original setpoint value.

22. The system of claim 18 wherein the means for determining the desired number of active controlled variables includes means for determining the number of active manipulated variables.

23. The system of claim 22 wherein the means for determining the number of active manipulated variables comprises means for determining whether a selected manipulated variable is responsive to control.

24. The system of claim 13 further comprising means for storing the original setpoint value.

25. A method for changing the number of active controlled variables in a multivariate control system, the multivariate control system including active and inactive controlled variables and available and unavailable manipulated variables, the method comprising,
    providing a predefined value for at least two active and inactive controlled variables,
    ordering the at least two active and inactive controlled variables based on the predefined values,
    providing at least two classes,
    ranking the at least two classes based on priority of control of the at least two classes,
    classifying the at least two active and inactive controlled variables into one of the at least two classes while preserving, within the at least two classes, the order based on the predefined values, and,
    changing the number of active controlled variables by performing at least one of,
        relinquishing control over an active controlled variable having a lowest priority in one of the at least two classes having a lowest priority rank, and
        asserting control over an inactive controlled variable having a highest priority in one of the at least two classes having a highest priority rank.

26. A method according to claim 25, wherein relinquishing control includes setting a setpoint of the lowest priority active controlled variable to the measured value of the lowest priority active controlled variable.

27. A method according to claim 25, wherein asserting control includes setting a setpoint of the highest priority inactive controlled variable to an original setpoint value.

28. A method according to claim 25, wherein relinquishing control includes causing a difference between the lowest priority active controlled variable and a setpoint associated with the lowest priority active controlled variable, to be zero.

29. A method according to claim 25, wherein classifying includes determining whether the measured value of the active and inactive controlled variable is outside a selected range.

30. A method according to claim 25, further including determining a desired number of active controlled variables.

31. A method according to claim 25, further including,
determining whether a measured value of a selected active or inactive controlled variable is valid or invalid, and,
if the selected controlled variable is an active controlled variable, setting the value of the selected active controlled variable to an original setpoint value if the measured value is invalid, or
if the selected controlled variable is an inactive controlled variable, setting the value of the selected inactive controlled variable to the measured value if the measured value is valid.

32. A method according to claim 31, wherein setting the value of the selected inactive controlled variable to the measured value comprises the steps of
defining an unshedding interval having
a first endpoint at which the value of the selected controlled variable is equal to its original setpoint value, and
a second endpoint at which the value of the selected controlled variable is equal to its measured value,
varying the selected controlled variable measurement variable during the unshedding interval.

33. A method according to claim 32, wherein varying the selected controlled variable measurement value during the unshedding interval includes linearly varying the controlled variable between the second endpoint and the first endpoint.

34. A method according to claim 30, wherein determining a desired number of active controlled variables includes determining a number of active manipulated variables.

35. A method according to claim 30, wherein determining a desired number of active controlled variables includes determining whether a selected manipulated variable is responsive to control.

36. A method according to claim 25, wherein relinquishing further includes storing the original setpoint value.

37. A method according to claim 25, wherein asserting control further includes retrieving a previously stored original setpoint value.

38. A system for changing the number of active controlled variables in a multivariate control system, the multivariate control system including active and inactive controlled variables and available and unavailable manipulated variables, the system comprising,
a processor with instructions to,
provide a predefined value for at least two active and inactive controlled variables,
order the at least two active and inactive controlled variables based on the predefined values,
provide at least two classes,
rank the at least two classes based on priority of control of the at least two classes,
classify the at least two active and inactive controlled variables into one of the at least two classes while preserving, within the at least two classes, the order based on the predefined values,
relinquish control over an active controlled variable having a lowest priority in one of the at least two classes having a lowest priority rank, and
assert control over an inactive controlled variable having a highest priority in one of the at least two classes having a highest priority rank.

39. A computer product for changing the number of active controlled variables in a multivariate control system, the multivariate control system including active and inactive controlled variables and available and unavailable manipulated variables, the computer product including a processor and instructions for causing the processor to,
provide a predefined value for at least two active and inactive controlled variables,
order the at least two active and inactive controlled variables based on the predefined values,
provide at least two classes,
rank the at least two classes based on priority of control of the at least two classes,
classify the at least two active and inactive controlled variables into one of the at least two classes while preserving, within the at least two classes, the order based on the predefined values, and,
change the number of active controlled variables by performing at least one of,
relinquish control over an active controlled variable having a lowest priority in one of the at least two classes having a lowest priority rank, and
assert control over an inactive controlled variable having a highest priority in one of the at least two classes having a highest priority rank.

* * * * *